United States Patent
Simpson et al.

(10) Patent No.: US 7,245,713 B1
(45) Date of Patent: Jul. 17, 2007

(54) CALL MONITORING

(75) Inventors: Anita Hogans Simpson, Decatur, GA (US); Hong T Nguyen, Atlanta, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 3 days.

(21) Appl. No.: 10/255,228

(22) Filed: Sep. 26, 2002

(51) Int. Cl.
*H04M 7/00* (2006.01)
*H04M 1/64* (2006.01)

(52) U.S. Cl. .......................... 379/221.01; 379/221.08; 379/88.22

(58) Field of Classification Search ............. 379/88.22, 379/88.23, 88.25, 88.26, 88.18, 88.12, 221.01
See application file for complete search history.

(56) References Cited

U.S. PATENT DOCUMENTS

| | | | |
|---|---|---|---|
| 4,811,381 A | 3/1989 | Woo et al. ................ 379/88.19 |
| 5,243,642 A | 9/1993 | Wise, Jr. et al. .............. 379/82 |
| 5,333,173 A | 7/1994 | Seazholtz et al. ............. 379/45 |
| 5,471,519 A * | 11/1995 | Howe et al. ............. 379/88.26 |
| 5,548,636 A * | 8/1996 | Bannister et al. ...... 379/390.01 |
| 5,590,171 A | 12/1996 | Howe et al. .................. 379/33 |
| 5,604,792 A * | 2/1997 | Solomon et al. ......... 379/88.23 |
| 5,668,862 A | 9/1997 | Bannister et al. ...... 379/207.14 |
| 5,748,718 A | 5/1998 | Manicone ................... 379/131 |
| 5,805,587 A | 9/1998 | Norris et al. ................ 370/352 |
| 5,905,774 A | 5/1999 | Tatchell et al. .......... 379/88.04 |
| 5,937,047 A | 8/1999 | Stabler ....................... 379/201 |
| 5,946,386 A | 8/1999 | Rogers et al. .............. 379/265 |
| 5,956,389 A * | 9/1999 | Jung ...................... 379/88.12 |
| 5,999,611 A | 12/1999 | Tatchell et al. ........ 379/211.02 |
| 6,031,896 A | 2/2000 | Gardell et al. ........... 379/88.17 |
| 6,101,249 A | 8/2000 | Weber ......................... 379/188 |
| 6,144,644 A * | 11/2000 | Bajzath et al. .............. 370/259 |
| 6,160,877 A | 12/2000 | Tatchell et al. ............. 379/197 |
| 6,295,341 B1 * | 9/2001 | Muller .................... 379/88.18 |
| 6,310,939 B1 * | 10/2001 | Varney .................... 379/88.01 |
| 6,337,898 B1 | 1/2002 | Gordon ..................... 379/67.1 |
| 6,393,122 B1 | 5/2002 | Belzile ....................... 379/358 |
| 6,411,682 B1 | 6/2002 | Fuller et al. ............... 379/67.1 |
| 6,438,222 B1 | 8/2002 | Burg ..................... 379/215.01 |
| 6,449,474 B1 | 9/2002 | Mukherjee et al. ......... 455/414 |
| 6,477,246 B1 | 11/2002 | Dolan et al. ........... 379/211.02 |
| 6,493,431 B1 | 12/2002 | Troen-Krasnow et al. ....................... 379/88.12 |
| 6,639,972 B1 | 10/2003 | Cannon et al. .......... 379/88.18 |
| 6,661,886 B1 | 12/2003 | Huart et al. ........... 379/215.01 |
| 6,714,637 B1 | 3/2004 | Kredo ................... 379/215.01 |

(Continued)

OTHER PUBLICATIONS

U.S. Appl. No. 10/346,926, filed Jan. 17, 2003, entitled "Remote Call Monitoring", Inventor: Anita Hogans Simpson.

(Continued)

*Primary Examiner*—Fan Tsang
*Assistant Examiner*—Joseph Phan
(74) *Attorney, Agent, or Firm*—Merchant & Gould

(57) ABSTRACT

Methods and systems are provided for monitoring calls routed to a telephone network-based voice mail system. When a subscriber receives a telephone call, a determination is made as to whether the call should be routed to the voice mail system. If call monitoring services are activated, a three-way communication is set up between the calling party, the voice mail system and the subscriber. The subscriber is bridged into the call on a listen-only basis, but upon command by the subscriber, the subscriber may answer the call.

24 Claims, 2 Drawing Sheets

U.S. PATENT DOCUMENTS

| | | | | |
|---|---|---|---|---|
| 6,738,461 | B2 | 5/2004 | Trandal et al. | 379/142.02 |
| 6,751,300 | B2* | 6/2004 | Muller | 379/88.18 |
| 6,754,311 | B1 | 6/2004 | Kampmeier et al. | 379/32.01 |
| 6,879,677 | B2 | 4/2005 | Trandal et al. | 379/215.01 |
| 6,898,275 | B2 | 5/2005 | Dolan et al. | 379/211.02 |
| 6,909,776 | B2 | 6/2005 | Holt et al. | 379/88.26 |
| 7,050,559 | B2 | 5/2006 | Silver et al. | 379/211.02 |
| 2003/0076941 | A1 | 4/2003 | Tiliks et al. | 379/196 |
| 2003/0108172 | A1 | 6/2003 | Petty et al. | 379/142.08 |
| 2003/0118160 | A1 | 6/2003 | Holt et al. | |
| 2004/0141593 | A1 | 7/2004 | Simpson | 379/88.12 |
| 2004/0258220 | A1* | 12/2004 | Levine et al. | 379/88.23 |

OTHER PUBLICATIONS

Office Action issued in connection with U.S. Appl. No. 10/346,926, dated Sep. 23, 2004.

U.S. Official Action dated Jan. 3, 2006 cited in U.S. Appl. No. 10/346,926.

Office Action issued in connection with U.S. Appl. No. 10/346,926, dated Jun. 16, 2005.

Office Action issued in connection with U.S. Appl. No. 10/026,394, dated Aug. 9, 2005.

Office Action issued in connection with U.S. Appl. No. 10/026,394, dated Dec. 19, 2003.

Office Action issued in connection with U.S. Appl. No. 10/026,394, dated Jun. 7, 2004.

Office Action issued in connection with U.S. Appl. No. 10/026,394, dated Dec. 29, 2004.

U.S. Final Official Action dated Aug. 9, 2006 cited in U.S. Appl. No. 10/346,926.

U.S. Appl. No. 10/026,394 entitled "Apparatus, System and Method for Monitoring a Call Forwarded to a Network-Based Voice Mail System" filed Dec. 21, 2001.

U.S. Appl. No. 11/439,371 entitled "Apparatus, System and Method for Monitoring a Call Forwarded to a Network-Based Voice Mail System" filed May 23, 2006.

U.S. Appl. No. 11/637,617, entitled "Remote Call Monitoring" filed Dec. 12, 2006.

U.S. Office Action dated Dec. 19, 2003 cited in U.S. Appl. No. 10/026,394.

U.S. Office Action dated Jun. 7, 2004, cited in U.S. Appl. No. 10/026,394.

U.S. Office Action dated Dec. 29, 2004 cited in U.S. Appl. No. 10/026,394.

U.S. Final Office Action dated Aug. 9, 2005 cited in U.S. Appl. No. 10/026,394.

* cited by examiner

CALL MONITORING

FIELD OF THE INVENTION

This invention relates generally to methods and systems for monitoring calls routed to a voice mail system from a subscriber telephone.

BACKGROUND OF THE INVENTION

A common use for telephone answering machines is call screening or call monitoring. In a typical setting, the user of a telephone answering machine may set the answering machine so that the user may listen to incoming messages as they are being recorded on the answering machine. If the user recognizes the voice of the calling party and would like to speak with the calling party, the user may answer the call. On the other hand, if the user does not recognize the calling party, or if the user otherwise does not want to take the call, the user simply may allow the calling party to finish recording the message. This call screening or call monitoring ability is particularly useful to avoid unwanted telephone solicitations.

Many modern telephone systems include network-based voice mail systems to which incoming calls are routed when the voice mail system user's telephone is busy or is not answered. In such systems incoming callers are routed directly to the voice mail system if the user's telephone is busy or is unanswered. That is, the call is not routed through the user's telephone where he or she may listen to the voice mail message being recorded by the calling party in order to screen or monitor the call. The user must simply wait until the message has been recorded by the calling party and then call into the voice mail system to retrieve the message. Moreover, if the user is away from the user's telephone at a remote location, the user has no way of knowing that a message has been left for the user other than to call into the voice mail system from time to time to check for voice mail messages.

It is with respect to these and other considerations that the present invention has been made.

SUMMARY OF THE INVENTION

In accordance with the present invention, the above and other problems are solved by methods and systems for monitoring calls routed to a telephone network voice mail system from a subscriber telephone. A subscriber to voice mail services contacts her telephone services provider to request call monitoring services. Once the subscriber is validated as an authorized subscriber, the subscriber may activate call monitoring services so that the subscriber may screen or monitor calls directed to a network-based voice mail system when the subscriber does not answer an incoming call.

After call monitoring setup is complete, the subscriber may monitor or screen incoming voice mail messages when the subscriber does not answer an incoming call. When the subscriber receives a telephone call, a determination is made as to whether the subscriber's line is busy or whether the call goes unanswered. If the subscriber's line is busy, the call is routed directly to the voice mail system where the calling party may leave a voice mail message for the subscriber. If the call goes unanswered, a query is triggered to a network element, such as a service control point, where a determination is made as to whether the call monitoring service is activated for the subscriber's line.

If call monitoring is activated for the subscriber's line, the network element routes the call to a second network element, such as a service node, and includes with the routed call the subscriber's telephone directory number, the voice mail system access number, and the calling party's telephone directory number. The second network element, such as the services node, then establishes a three-way conference call between the incoming calling party, the voice mail system and the subscriber in a listen-only mode. Thus, the subscriber may listen to the voice mail message being recorded by the calling party in order to screen or monitor the call. In order to set up the three-way conference call, the second network element, places a call to the subscriber at the subscriber's telephone directory number so that the subscriber may answer and listen to the voice mail message being recorded by the incoming calling party. If the subscriber answers the call form the second network element, the subscriber immediately may be bridged into the call between the calling party and the voice mail system without additional action by the subscriber. If desired, a distinctive ring may be provided to the subscriber to allow the subscriber readily to ascertain that the call is associated with the call monitoring service. Additionally, the telephone directory number of the second network element and a caller name identification such as "call monitoring service" may be provided in the caller identification screen of the subscriber's telephone.

If desired, when the subscriber answers the call from the second network element, the subscriber may be provided a recorded instruction as to how to interrupt the three-way communication and accept the call from the calling party. Accordingly, while the subscriber is listening to the incoming voice mail message, the subscriber may selectively interrupt the voice mail recording session and accept the call from the incoming calling party. If the subscriber chooses to accept the incoming call, the second network element, removes the voice mail system from the three-way communication to create a two-way communication between the calling party and the subscriber.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION

The following description of embodiments of the present invention is made with reference to the above-described drawings wherein like numerals refer to like parts or components throughout the several figures. The present invention is directed to methods and systems for monitoring calls routed to a network-based voice mail system.

Operating Environment

Figure 1:
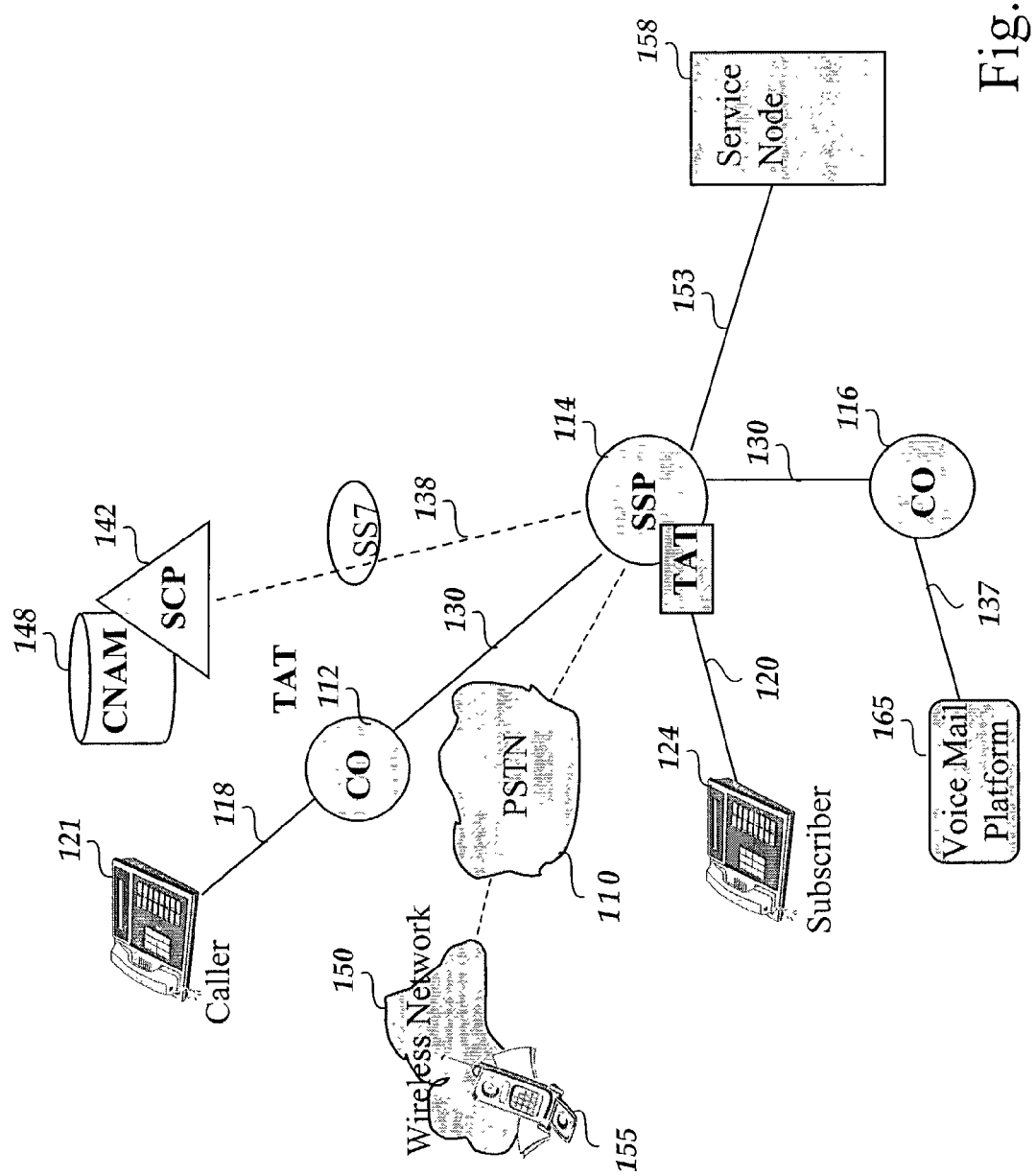
FIG. 1 is a simplified block diagram illustrating components of a wire line and wireless communications network that provides an operating environment for the present invention.

FIG. 1 is a block diagram illustrating components of a wireline and wireless telephone network that provides an exemplary operating environment for the present invention. The public switched telephone network 110 that evolved in the 1980s incorporated the advanced intelligent network (AIN). Some of the components of the advanced intelligent network are illustrated in FIG. 1. FIG. 1 is illustrative of at least a part of the advanced intelligent network (AIN) of a typical local exchange carrier integrated with components of a wireless network 150. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network 110. As shown in FIG. 1, each central office may include an electronic switch known to those skilled in the art as a service switching point (SSP). These are indicated in FIG. 1 as SSP switches 112, 114 and 116. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as the trunk circuit 130.

As shown in FIG. 1, switches (SSP) 112, 114, and 116 have a plurality of subscriber lines 118 and 120 connected thereto. Each of the subscriber lines 118 and 120 is connected to a terminating piece or pieces of customer premises equipment that are represented by telephones 121 and 124. SSP switches 112 and 114 are connected by a plurality of trunk circuits 130. These are the voice path trunks that interconnect the central offices 112 and 114 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 118 shown in FIG. 1.

Much of the intelligence, and the basis for many of the enhanced features of the network, resides in the local service control point (SCP) 142. As is known to those skilled in the art, service control points, such as the SCP 42, are physically implemented by relatively powerful fault tolerant computers. Among the functions performed by the service control points is maintenance of network databases used in providing enhanced services. Service control points, such as SCP 142, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

The modern Advanced Intelligent Network also includes service nodes (SN) such as the service node 158. Those skilled in the art are familiar with service nodes, which are physically implemented by the same types of computers that embody the SCP 142. In addition to the computing capability and data base maintenance features, service nodes 158 use ISDN lines and may include DTMF signal recognition devices, tone generation devices, text to speech (TTS) voice synthesis devices and other voice or data resources. As shown in FIG. 1, the connection is through the SSP. For example, SN 158 is connected to SCP 142 via ISDN links 153 to SSP 114, ISDN/SS7 protocol conversion in SSP 112, and SS7 links 138. According to a preferred embodiment, the ISDN links 153 serve as a primary rate interface (PRI) over which services may be provided to subscribers using wireline services such as the wireline telephone sets 121 and 124 and subscribers using wireless services such as the wireless units.

The voice mail system 165 is shown in FIG. 1 being functionally connected to the switch 116 and is a component of the network. That is, calls are routed to and from the voice mail system 165 at the control and direction of the network via such components as the SCP 142. According to one embodiment, the voice mail system 165 may be connected to the switch 116 via a voice trunk interface line 137 using a simplified message desk interface (SMDI) to allow a switch to deliver calling parties and called parties to the voice mail system and to allow the voice mail system to instruct the switch to set a message waiting indicator on a subscriber's telephone. In operation, the voice mail system 165 is treated like a switch 114 whereby calls directed to voice mail boxes maintained at the voice mail system 165 are directed to the voice mail system 165 as calls are directed to customer premises equipment, such as telephones, via switches 112, 114.

The voice mail system 165 typically includes a computer or collection of computers, recording and recording playback devices, and software for recording announcements for incoming calls, recording and playing back recorded messages, and for receiving incoming calls and for making outgoing calls at the direction of the network. In addition to the recording and playback functionality, the voice mail system 165 includes text-to-speech (TTS) and speech-to-text (STT) synthesis devices and software for conversion of analog voice messages to digitized forms such as WAV files and MP3 files. The voice mail system 165 has memory capacity for saving announcements to incoming callers and for saving messages from incoming callers.

The wireless network 150, such as a cellular network, comprises a mobile switching center (MSC) (not shown). The MSC is a switch providing services and coordination between wireless users in the network 150 and external networks. The MSC also communicates with a wireless subscriber, such as wireless telephone. The wireless telephone 155 is also illustrative of other wireless computing devices, such as pagers and personal digital assistants.

In operation, the intelligent network elements of the AIN, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 112 and 114, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 112 to take a certain action. If the SSP 112 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

Operation

Having described an operating environment for the present invention with reference to FIG. 1, the following is a description of the logical flow of steps performed by methods and systems of the present invention for activating and deactivating a call monitoring service according to the present invention. Also described are the logical flows of steps performed by methods and systems of the present invention for monitoring calls routed to a network-based voice mail system according to a variety of call monitoring service filter settings.

In order to provision call monitoring services on the subscriber's line 120, a subscriber contacts her telephone services provider. According to one embodiment of the present invention the subscriber may contact the telephone services provider via her telephone 124 using a feature code such as "*12" for allowing the subscriber access to the call monitoring services for activating the call monitoring service on her telephone line. According to an alternative embodiment, the subscriber may contact the telephone services provider via an Internet-based website operated by the telephone services provider for allowing subscribers to access services such as the call monitoring services of the present invention via a personal computer.

Once the subscriber is validated as being authorized to activate or deactivate the call monitoring service by requiring an identification such as a pass code from the subscriber, the subscriber's switch 114 queries the service control point 142 for the current status of the call monitoring service. In response, an announcement may be played to the subscriber such as "call monitoring is on, or call monitoring is off." A menu of options is provided to the subscriber to allow the subscriber to edit the current operating status of the call monitoring service on her telephone line. For example, the subscriber may turn the call monitoring service on or off in response to a message such as "to activate the call monitoring service, press 1." If the subscriber selects to have the call monitoring service activated, then when the subscriber does not answer an incoming call the call monitoring service is provided if the incoming call is passed to the voice mail system.

Figure 2:
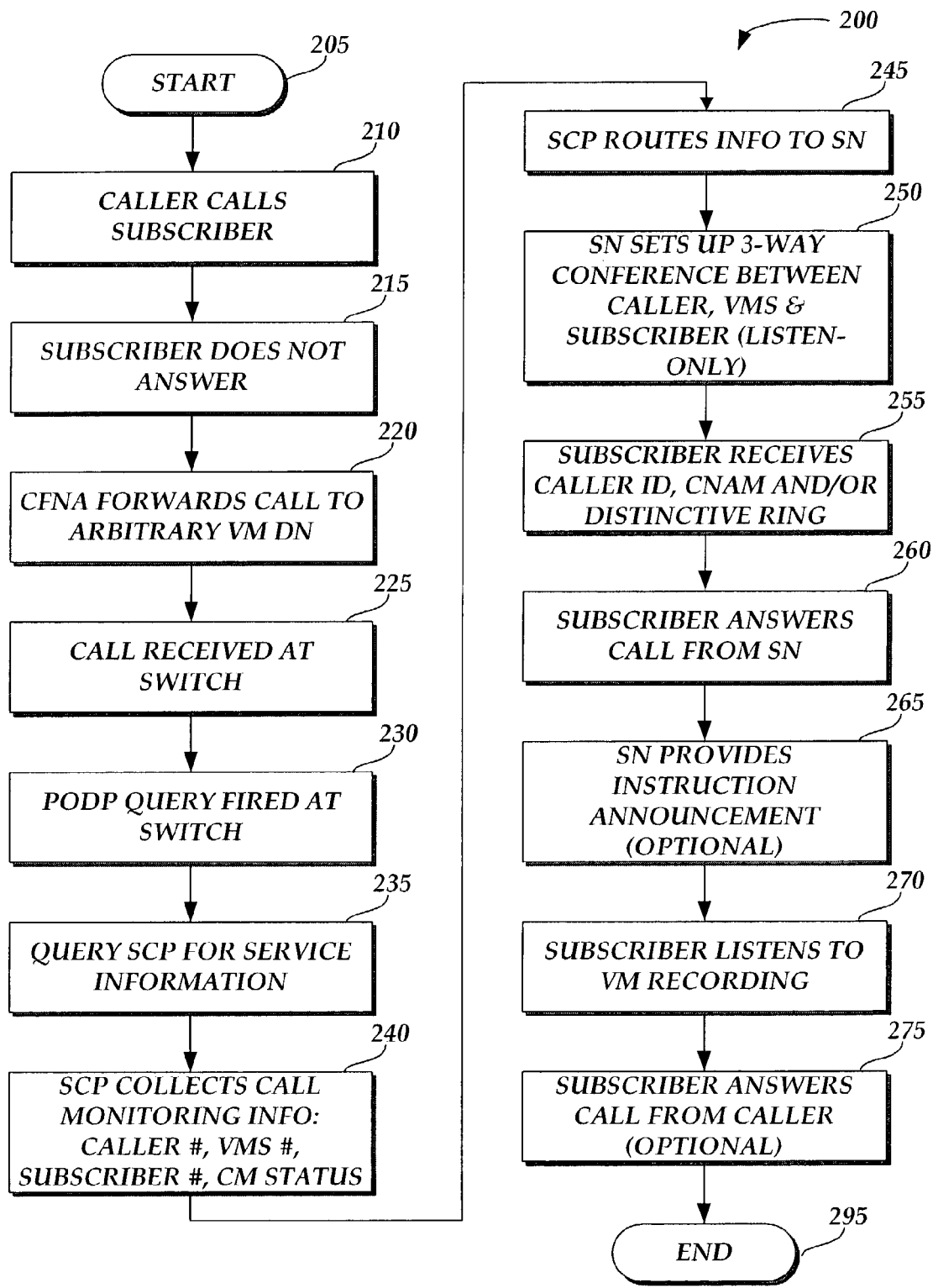
FIG. 2 illustrates a logical call flow of the steps performed by a method system of the present invention for monitoring calls routed to a network-based voice mail system.

FIG. 2 illustrates a logical call flow of the steps performed by a method and system of the present invention for monitoring calls routed to a network-based voice mail system. The method 200 begins at start step 205 and proceeds to step 210. At step 210, a calling party utilizing her telephone 121 dials the telephone directory number of the subscriber at the subscriber's telephone 124. At step 215, a determination is made at the subscriber's switch 114 as to whether the call is answered. If the call is answered, the method ends. If the call is not answered a determination is made as to whether a Call Forwarding No Answer feature is activated or whether a Call Forwarding on Busy feature is activated. As should be understood by those skilled in the art, if a Call Forwarding No Answer feature is activated, then calls directed to the subscriber's telephone directory number are forwarded to the voice mail system 165 if the call to the subscriber is not answered. If the Call Forwarding on Busy feature is activated then calls directed to the subscriber's telephone directory number are forwarded to the voice mail system 165 if the subscriber's line 120 is busy.

If the call is not answered by the subscriber at step 215, the call is routed to the voice mail system 165 directory number or access number at step 220 so that the calling party may leave a message for the subscriber in a subscriber voice mail box provisioned at the voice mail system 165. At step 225, the call is received at the switch 114 for routing to the voice mail system 165. At step 230, because call monitoring has been provisioned for the subscriber, the routing of the call to the switch 114 for ultimate routing to the voice mail system 165 fires a public office dialing plan (PODP) trigger for obtaining call monitoring services. As should be understood, other types of triggers such as a termination attempt trigger (TAT) may be used instead of the PODP trigger. According to a preferred embodiment, a single query, such as the PODP triggered query, is required to invoke the call monitoring functionality as described herein. If call monitoring service is not provisioned on the subscriber's line 120, the incoming call is routed directly to the voice mail system 165 where the calling party may leave a voice mail message for the subscriber.

At step 240, SCP 142 checks the call monitoring service status on the subscriber's line 120. If the call monitoring status is set to OFF, the call is routed directly to the voice mail system 165 without call monitoring treatment. If the call monitoring status is set to ON, the SCP collects information and call processing instructions. The SCP 142 collects the calling party's directory number from the query message, the subscriber's directory number retrieved from a subscriber database, and the voice mail system directory number or access number. The SCP 142 may also retrieve call processing instructions related to the subscriber's subscription of services. Call processing instructions include whether the subscriber is to be provided with a distinctive ring and whether the subscriber is to be provided with an instruction as to how to interrupt the call monitoring service to accept the call from the calling party.

At step 245, the SCP 142 routes to the service node 158 the calling party directory number, the subscriber directory number, and the voice mail system 165 directory number or access number. At step 250, the service node 158 sets up a three-way call between the calling party, the voice mail system 165 and the subscriber through the central office switch 114. The service node 158 bridges the subscriber into the call between the calling party and the voice mail system 165 via the subscriber's telephone 124 by placing a call to the subscriber via the subscriber's directory number. The service control point may obtain from the caller name (CNAM) database 148 a caller identification name for the service node 158, such as "call monitoring," and pass that caller identification information to the subscriber at the telephone 124 so that the subscriber will recognize that the call from the service node 158 is associated with the call monitoring service.

At step 260, when the subscriber answers a call from the service node 158 at the subscriber's telephone 124, the subscriber is bridged into the call between the calling party and the voice mail system 165 to set up a three-way communication so that the subscriber immediately may listen to the message being recorded by the calling party in order to screen or monitor the call. According to an embodiment of the present invention, at step 265, once the subscriber answers the call from the service node 158 an announcement is provided to subscriber such as "call monitoring, to talk to the calling party press 1." If the announcement is not provided, the subscriber immediately may listen to the voice mail message being left by the calling party upon answering the call from the SN 158.

At step 270, the subscriber listens to the voice mail being left by the calling party, and monitoring of the incoming voice mail message may be set for a duration equal to the amount of time available to the calling party for leaving a voice mail message to the subscriber. That is, if the calling party may leave a message up to a length of 120 seconds, then the subscriber may listen to the recording of the voice mail message for up to 120 seconds.

At step 275, if the subscriber elects to interrupt the voice message and accept the call in response to the prompt from the service node 158, the service node 158 removes the voice mail system 165 from the three-way communication between the voice mail system, the calling party and the subscriber. The service node then may transfer the call between the subscriber and calling party to the central office or SSP hosting the SN 158 to make available the PRI ports of the SN 158 for other calls.

According to an alternative embodiment, the subscriber may subscribe to a distinctive ringing service whereby the subscriber may store and select the call monitoring directory number associated with a call monitoring service call from the SN 158 for presentation with a distinctive ring anytime a call from that number is received. As is known to those skilled in the art, distinctive ringing services allow a subscriber to select certain numbers for presentation with distinctive rings. For example, if the subscriber selects a close friend's telephone directory number as a distinctive ringing number, when the subscriber receives a telephone call from that telephone directory number, the subscriber is presented with a distinctive ring that alerts the subscriber to the identity of that calling party. According to an embodiment of the present invention, the calling party may select the call monitoring service directory number associated with the service node 158 for treatment with a distinctive ring. Accordingly, when the subscriber receives a call monitoring service call from the service node 158, as described above, the subscriber will receive a distinctive ring to alert the subscriber that the incoming call is a call monitoring service call.

As described, methods and systems are provided for monitoring calls routed to a network-based voice mail system. It will be apparent to those skilled in the art that various modifications and variations may be made in the present invention without departing from the scope or spirit of the invention. Other embodiments of the invention will be apparent to those skilled in the art from consideration of the specification and practice of the invention described herein.

We claim:

1. A method of monitoring calls routed to a voice mail system, comprising:

receiving a call from a calling party directed to a directory number of a subscriber;

determining whether the call from the calling party is answered;

if the call from the calling party is not answered, then determining whether the call should be forwarded to the voice mail system;

if the call should be forwarded to the voice mail system, querying a first network element for call monitoring services, wherein the first network element is a Service Control Point (SCP) of an Advanced Intelligent Network (AIN);

at the SCP, providing call monitoring instructions to a second network element, wherein the second network element is a Services Node (SN) of the AIN and wherein the call monitoring instructions include the directory number of the subscriber, an access number associated with the voice mail system, and a directory number associated with the calling party;

at the SN, setting up a communication between the calling party and the voice mail system;

at the SN, calling the subscriber via the directory number of the subscriber;

at the SN, providing an announcement to the subscriber providing the subscriber a recorded instruction for interrupting the three-way communication in order to accept the call from the calling party; and if the call from the SN is answered, setting up a three-way communication between the calling party, the voice mail system, and the subscriber wherein setting up the three-way call is initiated only by the call from the SN being answered.

2. The method of claim 1, wherein setting up a three-way communication between the calling party, the voice mail system and the subscriber, includes allowing the subscriber to listen only to a voice message while the voice message is being recorded by the calling party into the voice mail system.

3. The method of claim 2, further comprising:

interrupting the three-way communication between the calling party, the voice mail system and the subscriber; and connecting the call from the calling party to the subscriber at the subscriber directory number to allow a two-way communication between the calling party and the subscriber.

4. The method of claim 3, wherein connecting the call from the calling party to the subscriber at the subscriber directory number to allow a two-way communication between the calling party and the subscriber includes:

removing the voice mail system from the three-way communication; and transferring the two-way communication away from the SN.

5. The method of claim 1,
wherein receiving a call from a calling party directed to a subscriber directory number, includes receiving the call at a subscriber switch; and
wherein querying a first network element for call monitoring services includes firing a public office dialing plan (PODP) trigger at the subscriber switch to launch a query to the first network element.

6. The method of claim 1, wherein determining whether the call should be forwarded to the voice mail system includes determining whether the call is answered.

7. The method of claim 1, prior to setting up a three-way communication between the calling party, the voice mail system and the subscriber, providing the subscriber a calling party identification associated with the call monitoring services to alert the subscriber that an incoming call from the second network element is associated with call monitoring services.

8. The method of claim 1, prior to setting up a three way communication between the calling party, the voice mail system and the subscriber, providing the subscriber a distinctive ring to alert the subscriber that an incoming call from the second network element is associated with call monitoring services.

9. A system for monitoring calls routed to a voice mail system, comprising:
a switch operative
to receive a call from a calling party directed to a directory number of a subscriber;
to determine whether the call is answered;
to determine whether the call should be forwarded to the voice mail system if the call is not answered;
to query a first network element for call monitoring services if the call should be forwarded to the voice mail system, wherein the first network element is a Service Control Point (SCP) of an Advanced Intelligent Network (AIN);
the SCP operative to provide call monitoring instructions to a second network element, wherein the second network element is a Services Node (SN) of the AIN and wherein the call monitoring instructions include the directory number of the subscriber, a directory number associated with the voice mail system, and a directory number associated with the calling party;
the SN operative
to set up a communication between the calling party and the voice mail system;
to call the subscriber via the directory number of the subscriber;
to provide the subscriber recorded instructions for interrupting the three-way communication in order to accept the call from the calling party; and
to set up a three-way communication between the calling party, the voice mail system and the subscriber if the call from the second network element is answered wherein setting up the three-way call is initiated only by the call from the second network element being answered.

10. The system of claim 9, wherein the SN is further operative to allow the subscriber to listen only to a voice message while the voice message is being recorded by the calling party into the voice mail system.

11. The system of claim 10, wherein the SN is further operative
to interrupt the three-way communication between the calling party, the voice mail system and the subscriber; and
to connect the call from the calling party to the subscriber at the subscriber directory number to allow a two-way communication between the calling party and the subscriber.

12. The system of claim 11, wherein the SN is further operative
to remove the voice mail system from the three-way communication; and
to transfer the two-way communication away from the second network element.

13. The system of claim 9, wherein the switch is further operative to fire a public office dialing plan (PODP) trigger at the switch to launch a query to the SCP for call monitoring services if the call should be forwarded to the voice mail system.

14. The system of claim 9, wherein the SCP is further operative to provide the subscriber a calling party identification associated with the call monitoring services to alert the subscriber that an incoming call from the SN is associated with call monitoring services.

15. The system of claim 9, wherein the SCP is further operative to cause the switch to provide the subscriber a distinctive ring to alert the subscriber that an incoming call from the SN is associated with call monitoring services.

16. A method of monitoring calls routed to a voice mail system, comprising:
receiving a call from a calling party directed to a directory number of a subscriber, wherein the call from the calling party is associated with a first ring;
determining whether the call from the calling party is answered;
if the call from the calling party is not answered, then determining whether the call should be forwarded to the voice mail system;
if the call should be forwarded to the voice mail system, querying a first network element for call monitoring services;
at the first network element, providing call monitoring instructions to a second network element, wherein the call monitoring instructions include the directory number of the subscriber, an access number associated with the voice mail system, and a directory number associated with the calling party;
at the second network element, setting up a communication between the calling party and the voice mail system;
at the second network element, calling the subscriber via the directory number of the subscriber;
providing the subscriber a second ring associated with the call from the second network element to alert the subscriber that the call from the second network element is associated with the call monitoring services, wherein the second ring is distinct from the first ring;
at the second network element, providing the subscriber a recorded instruction in order to accept the call from the calling party, wherein the recorded instruction is sent by the second network element; and
if the call from the second network element is answered, setting up a three-way communication between the calling party, the voice mail system, and the subscriber wherein setting up the three-way call is initiated only by the call from the second network element being answered.

17. The method of claim 16, wherein setting up a three-way communication between the calling party, the voice mail system, and the subscriber, includes allowing the subscriber to listen only to a voice message while the voice message is being recorded by the calling party into the voice mail system.

18. The method of claim 16, further comprising:
providing an announcement to the subscriber providing the subscriber instructions for interrupting the three-way communication in order to accept the call from the calling party;
interrupting the three-way communication between the calling party, the voice mail system, and the subscriber; and
connecting the call from the calling party to the subscriber at the subscriber directory number to allow a two-way communication between the calling party and the subscriber.

19. The method of claim 18, wherein connecting the call from the calling party to the subscriber at the subscriber directory number to allow a two-way communication between the calling party and the subscriber includes:
removing the voice mail system from the three-way communication; and
transferring the two-way communication away from the second network element.

20. The method of claim 16, wherein receiving a call from a calling party directed to a subscriber directory number, includes receiving the call at a subscriber switch; and
wherein querying a first network element for call monitoring services includes firing a public office dialing plan (PODP) trigger at the subscriber switch to launch a query to the first network element.

21. The method of claim 16, wherein determining whether the call should be forwarded to the voice mail system includes determining whether the call is answered.

22. The method of claim 16, wherein the first network element is a Service Control Point (SCP) of an Advanced Intelligent Network (AIN).

23. The method of claim 22, wherein the second network element is a Service Node (SN) of the AIN.

24. The method of claim 16, prior to setting up a three-way communication between the calling party, the voice mail system, and the subscriber, providing the subscriber a calling party identification associated with the call monitoring services to alert the subscriber that an incoming call from the second network element is associated with call monitoring services.

* * * * *